UNITED STATES PATENT OFFICE.

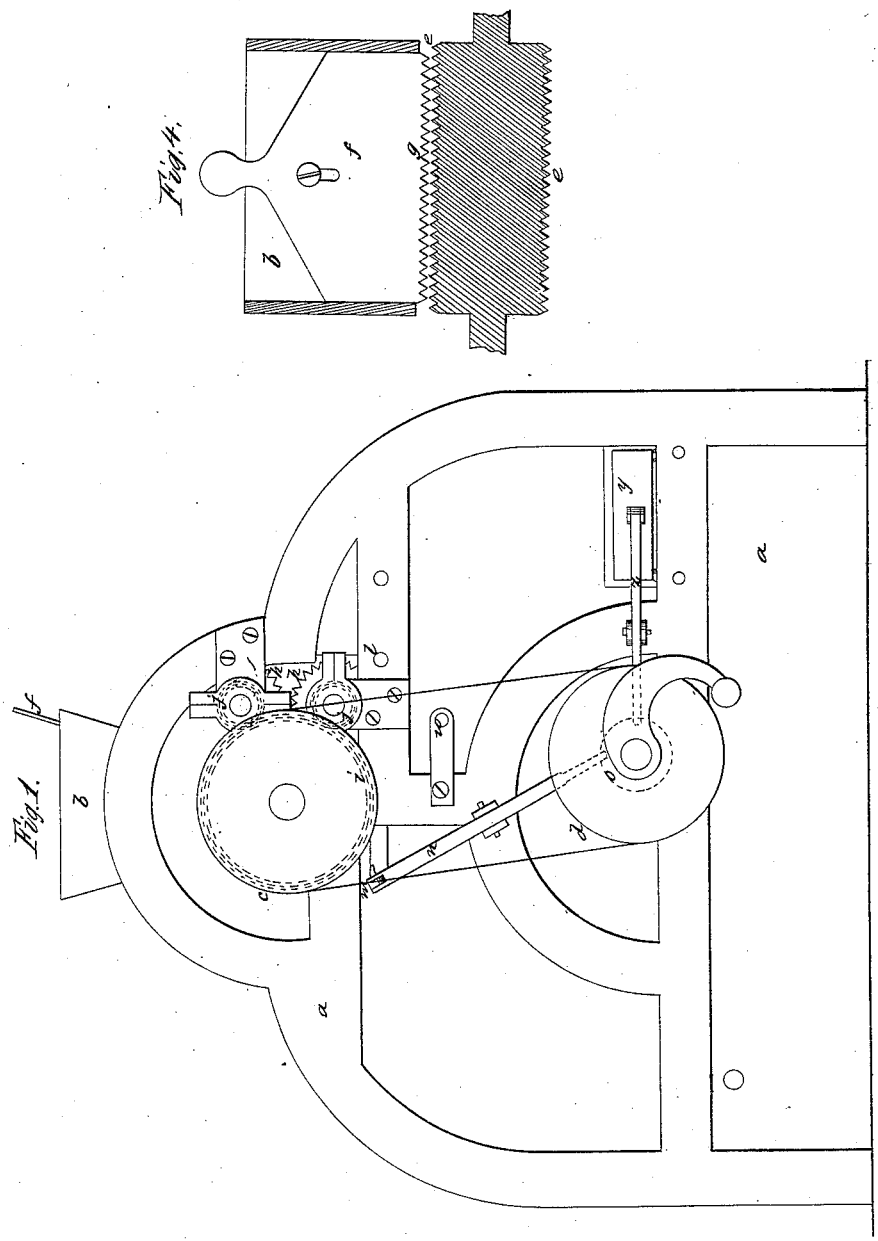

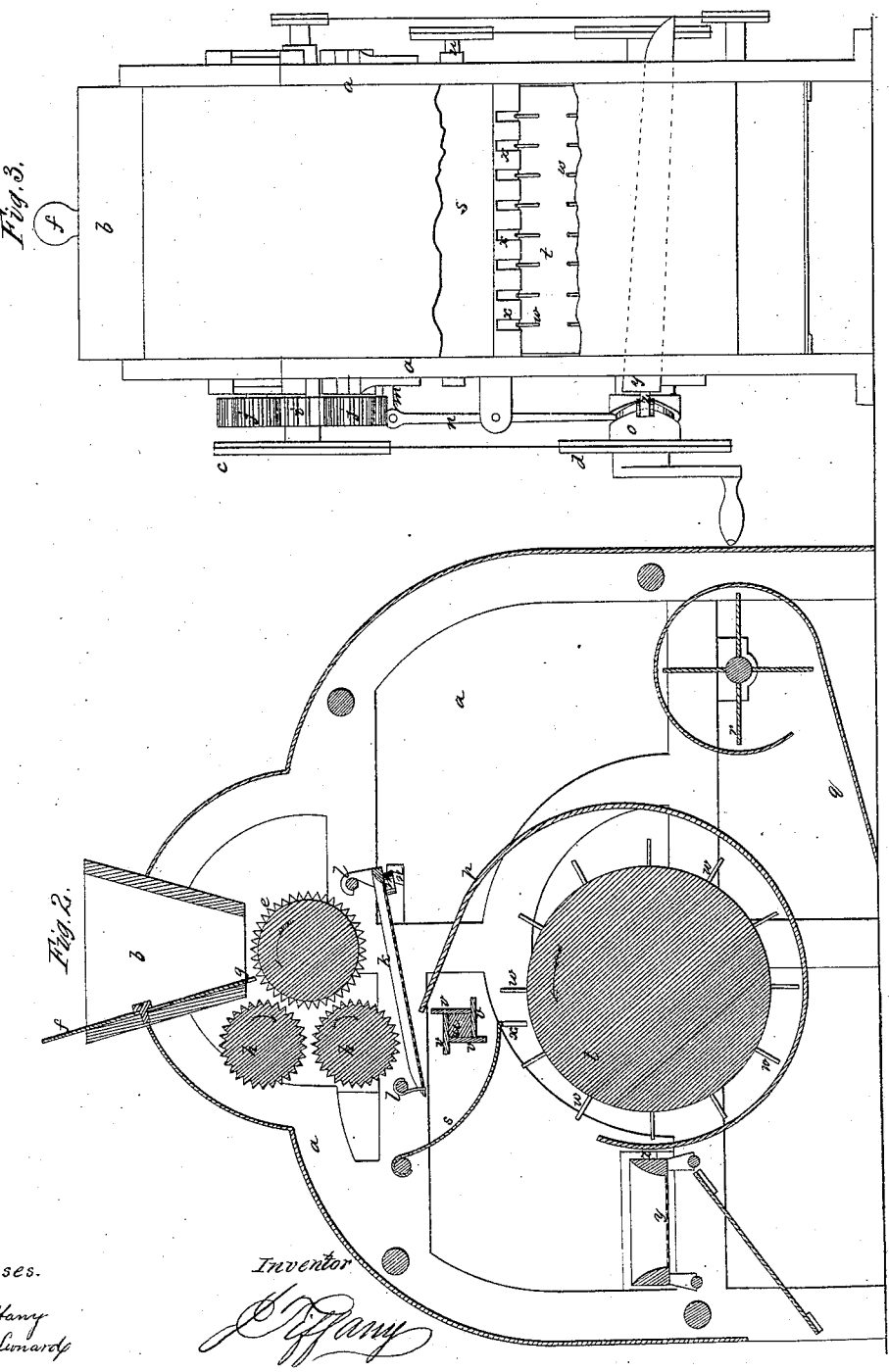

JOEL TIFFANY, OF SYRACUSE, NEW YORK.

MACHINE FOR HULLING COTTON-SEED.

Specification of Letters Patent No. 30,096, dated September 18, 1860.

*To all whom it may concern:*

Be it known that I, JOEL TIFFANY, of Syracuse, in the State of New York, have invented certain new and useful Improvements in the Machine for Hulling Cotton-Seeds; and I do hereby declare that the following is a full, clear, and exact description thereof, reference being had to the accompanying drawings, making part of this specification, in which—

Figure 1, is an elevation of one side of the machine; Fig. 2, a vertical section; Fig. 3, a front elevation with a portion of the casing removed to exhibit a part of the internal arrangement; and Fig. 4, a separate view of the main roller and hopper.

The same letters indicate like parts in all the figures.

The great object to be attained in hulling cotton seed by machinery, is to remove the hull without crushing or cutting the kernel, which when broken or cut readily yields the contained oil that is thereby wasted. As the kernel is of a wax like structure if it be either crushed or cut it soon clogs the machinery and renders it inefficient. I am aware that various attempts have been made to construct machinery for this purpose with rollers grooved longitudinally on their peripheries, to form channels to receive the cotton seeds so that they shall project sufficiently above the grooves to enable the sharp cutting edges of other grooved rollers to cut into them to get hold of the hull and strip it off; but this mode of operation is defective for the reason that either the cutting edges fail to take hold of the hull or they cut into the kernel. By my invention I avoid these difficulties, and the principle or mode of operation of my said invention by which I accomplish the desired result, consists in the employment of a main roller, and one or more working rollers, all grooved longitudinally and circumferentially—forming square pyramidal teeth brought to a point, the periphery of the rollers being placed so near that the seeds which lodge in the spaces between the teeth on the main roller, in passing the working roller or rollers formed with similar teeth, shall have their hulls first cracked by pressure, that the teeth of the working roller or rollers may get hold of the hull so cracked and by reason of traveling at a greater velocity than the main roller strip off the hull, and in that way avoid serious injury to the kernel.

My said invention also consists in combining with the rollers, having a mode of operation such as above stated, a range of teeth on one side of the hopper and so placed sufficiently near to the periphery of the main hulling roller as to insure that not more than one range of seeds shall enter the spaces between the teeth on the main roller, and at the same time to aid in stripping off the fibers of cotton which adhere to the outside of the hulls.

My said invention also consists in combining with the rollers having a mode of operation such as above described, the employment of a screen or seive to separate the hulls from the kernels and with a whipping cylinder armed with teeth which play between stationary teeth to act upon such of the kernels as are not entirely freed from hulls and fibers.

My said invention also consists in combining a final screening operation with the whipping cylinder and its appendages and with the main and working rollers to effect the combined operations.

In the accompanying drawings (*a*) represents a frame suitable for the purpose, and (*b*) a hopper to receive the cotton seeds to be hulled. Just under this hopper and forming the bottom thereof is a horizontal roller termed the main roller rotated by a pulley (*c*) on its shaft receiving a band from a pulley (*d*) on the main shaft which is also the shaft of the whipping cylinder to be presently described. The periphery of this roller is grooved or fluted in the direction of its length and of its circumference forming square pyramidal teeth which are brought to a point as represented at (*e*). The depth and width of these grooves should be such as to receive and hold only one cotton seed.

At the back of the hopper there is a gage plate (*f*) attached by a screw passing through an elongated hole, or by other suitable means, to admit of adjusting its lower edge relatively to the periphery of the main roller; the lower edge of the said plate is formed with teeth (*g*) corresponding in form to a radial section of the teeth on the roller, and the plate is to be so set relatively to the teeth on the main roller that as the roller rotates in the direction of the arrow under the hopper not more than one thickness of seeds at a time shall pass out of the hopper in the grooves of the main roller, the teeth on the edge of the plate at the same time having the effect to strip off from the seeds the adhering fibers of cotton, the presence of which tends to impel the operation of hulling. Instead of a separate plate the back of the hopper may be formed with teeth like this plate.

Behind the hopper, and in close proximity to the main roller, there are two working rollers ($h, h$) which I prefer to make of less diameter than the main roller, but grooved in like manner to form similar teeth, but so disposed relatively to the teeth on the main roller that each zone of teeth on the working rollers shall come opposite the groove between two zones of teeth on the main roller. These working rollers are placed so near to the main roller that the circles generated by the points of their teeth nearly touch. The two working rollers rotate in the same direction, and both of them in the reverse direction but at a higher velocity than the main roller, motion being imparted by a cog wheel ($i$) on the shaft of the main roller the cogs of which engage two pinions ($j, j$) one on the shaft of each of the working rollers. As the main roller rotates, and its toothed periphery passes from under the hopper with the cotton seed so disposed that there will be one seed in each quadrangular space between four teeth, the seeds so disposed and held are carried by the upper one of the working rollers the teeth of which first crack the hulls by pressure and as the teeth travel with greater velocity than the periphery of the main roller the points of the teeth take hold of the cracked hulls and strip them from the kernels. Such of the seeds as are carried by the first working roller without being hulled are carried to and will be hulled by the second working roller which operates just like the first. I do not wish however to be understood as limiting my claim of invention to the use of two working rollers, as one only, or more than two, may be used, although I prefer two.

Immediately under the main and the working rollers there is an inclined sieve or screen ($k$) suspended from two rods ($l, l$) on which it is made to slide laterally to give the shaking motion by a connecting rod ($m$) and lever ($n$) which receives a vibratory motion from a cam ($o$) on the shaft of the driving pulley. The particles of broken hulls, dust, &c., that pass through the meshes of this screen fall onto the outside surface of a curved plate ($p$) which surrounds the whipping cylinder, to be presently described, and descending on that surface fall in front of the blast opening ($q$) of a rotating fan blower ($r$) by which they are blown out leaving behind such particles of broken kernels as may have been produced and carried through the screen ($k$). But the mass of kernels and the remaining hulls and fibers are discharged from the end of the screen onto a chute or guide plate ($s$) by which they are delivered to the action of a whipping cylinder ($t$) below, and to insure this delivery a rotating shaft ($u$) with wings ($v$) is placed above the chute ($s$) so that the wings catch the kernels, &c., and throw them against the concave or inner surface of the curved plate ($p$) which forms a case surrounding about three quarters of the circumference of the whipping cylinder. The kernels, hulls, and adhering fibers, thus thrown into this case are caught by the radial teeth ($w$) on the whipping cylinder ($p$) which rotates in the direction of the arrow, and thrown and whipped against a series of teeth ($x$) on the lower edge of the chute ($s$) and which hang down between the teeth on the cylinder; by this operation the remaining hulls and fibers of cotton are thoroughly loosened from the kernels, and the kernels thrown by the rotation of the said whipping cylinder onto another sieve or screen ($y$) together with the fragments of hulls, &c., where the final separation is effected by the shaking motion of the said screen, imparted by a vibrating lever ($z$) which is vibrated by the cam ($o$) which operates the lever of the first described screen.

Having thus described the special mode of application of my said invention, I do not wish to be understood as limiting my claim of invention to such special mode of application, as it will be obvious to the experienced mechanician that the mode of application may be varied without changing the principle of my said invention.

What I claim as my invention, and desire to secure by Letters Patent, is—

1. The employment of the main rotating roller formed, substantially as described, with pyramidal teeth by longitudinal and circumferential grooves, when operating in combination with one or more working rollers having similarly formed teeth, and so arranged and geared that the periphery of the working roller shall travel with greater velocity than the periphery of the main roller, the zones of teeth on the working roller operating opposite the spaces between the zones of teeth on the main roller, substantially as, and for the purpose specified.

2. In combination with the main and the working rollers having a construction and mode of operation, substantially such as herein described, the employment of a range of teeth on one of the bottom edges of the hopper, substantially as, and for the purpose specified.

3. In combination with the main and the working rollers substantially such as above described, the employment of a screen or seive below them, and a rotating whipping cylinder of teeth below the screen, substantially as described, that the screen may separate the loose hulls from the kernels, and that the whipping cylinder of teeth may finally loosen the remaining hulls and fibers, substantially as set forth.

4. In combination the main and working rollers for hulling, the screen for effecting the first separation, the whipping cylinder of teeth that play between fixed teeth to effect the final loosening of the hulls and fibers from the kernel, and the final screen for effecting the final separation of the kernels from the last fragments of hull and from fibers, substantially as set forth.

J. TIFFANY.

Witnesses:
J. HUNT,
I. F. DURSTON.